(12) United States Patent
Suzuki et al.

(10) Patent No.: US 11,088,599 B2
(45) Date of Patent: Aug. 10, 2021

(54) BRUSHLESS MOTOR (71) Applicant: DENSO CORPORATION, Kariya (JP)

(72) Inventors: Akihiko Suzuki, Kosai (JP); Takeo Noda, Kosai (JP)

(73) Assignee: DENSO CORPORATION, Kariya (JP)

( * ) Notice: Subject to any disclaimer, the term of this patent is extended or adjusted under 35 U.S.C. 154(b) by 471 days.

(21) Appl. No.: 16/072,873

(22) PCT Filed: Apr. 6, 2017

(86) PCT No.: PCT/JP2017/014400
§ 371 (c)(1),
(2) Date: Jul. 25, 2018

(87) PCT Pub. No.: WO2017/183473
PCT Pub. Date: Oct. 26, 2017

(65) Prior Publication Data
US 2019/0044422 A1 Feb. 7, 2019

(30) Foreign Application Priority Data

Apr. 19, 2016 (JP) .............................. JP2016-083798

(51) Int. Cl.
*H02K 11/40* (2016.01)
*H02K 29/00* (2006.01)
(Continued)

(52) U.S. Cl.
CPC .............. *H02K 11/40* (2016.01); *H02K 5/00* (2013.01); *H02K 5/1735* (2013.01); *H02K 5/225* (2013.01);
(Continued)

(58) Field of Classification Search
CPC .......... H02K 11/40; H02K 29/00; H02K 5/00; H02K 11/33; H02K 5/225; H02K 7/085;
(Continued)

(56) References Cited

U.S. PATENT DOCUMENTS

2016/0315524 A1* 10/2016 Ozaki .................... H02K 11/33
2017/0133904 A1* 5/2017 Takayama ............ H02K 5/1737

FOREIGN PATENT DOCUMENTS

CN 102780306 A 11/2012
CN 203813607 U 9/2014
(Continued)

OTHER PUBLICATIONS

English language translation of the following: Office action dated Sep. 4, 2019 from the SIPO in a Chinese patent application No. 201780008074.1 corresponding to the instant patent application. This office action translation is submitted now in order to supplement the understanding of the cited references which are being disclosed in the instant Information Disclosure Statement.
(Continued)

*Primary Examiner* — Tulsidas C Patel
(74) *Attorney, Agent, or Firm* — SOLARIS Intellectual Property Group, PLLC (57) ABSTRACT An object is to provide a brushless motor capable of effectively shutting off and absorbing electromagnetic noise caused from a stator, while achieving cost reduction. A brushless motor 10 includes: a shaft 12; a rotor 14; a stator 16; a first bearing 18; a second bearing 20; a bearing holder member 22; a center piece 24; and a circuit board 26. The bearing holder member 22 is made of metal and holds the first bearing 18. The center piece 24 is made of resin and holds the second bearing 20 and the stator 16. The center piece 24 is provided with a conductive part 120 (a plating layer 94 and a terminal member 102) that electrically connects the bearing holder member 22 and the second bearing 20 to a ground part 92 of the circuit board 26.

7 Claims, 8 Drawing Sheets (51) Int. Cl.
*H02K 5/00* (2006.01)
*H02K 11/33* (2016.01)
*H02K 21/22* (2006.01)
*H02K 5/173* (2006.01)
*H02K 5/22* (2006.01)
*H02K 7/08* (2006.01)

(52) U.S. Cl.
CPC ............ *H02K 7/085* (2013.01); *H02K 11/33* (2016.01); *H02K 21/22* (2013.01); *H02K 29/00* (2013.01); *H02K 2211/03* (2013.01)

(58) Field of Classification Search
CPC ... H02K 21/22; H02K 5/1735; H02K 2211/03
See application file for complete search history.

(56) References Cited

FOREIGN PATENT DOCUMENTS

| | | |
|---|---|---|
| JP | 4083353 B2 | 4/2008 |
| JP | 2012-237334 A | 12/2012 |
| WO | 2009/113311 A1 | 9/2009 |

OTHER PUBLICATIONS

English language translation of the following: Office action dated Oct. 23, 2019 from the JPO in a Japanese patent application No. 2016-083798 corresponding to the instant patent application. This office action translation is submitted now in order to supplement the understanding of the cited reference which is being disclosed in the instant Information Disclosure Statement.

* cited by examiner

BRUSHLESS MOTOR

TECHNICAL FIELD

The present invention relates to a brushless motor.

BACKGROUND ART

In recent years, in a field of onboard air-conditioning blower motors, there is an increasing demand for a brushless motor mounted with a circuit board from the viewpoints of easy control and securing of a mounting space and the like (e.g., see Patent Literature 1). In such a brushless motor, since a stator is driven by a high-frequency control signal, electromagnetic noise poses a problem. Therefore, as a countermeasure against electromagnetic noise, shutting off electromagnetic noise is important, such as reduction of oscillation energy.

In order to reduce oscillation energy, prevention measures to leakage of electromagnetic noise by a pattern layout of the circuit board or by a filter element is conceivable. However, the filter element needs to be increased in size in an AM band with a low frequency among electromagnetic noises, which poses a problem of increase in cost and securing a mounting space. Therefore, countermeasures are taken combining a structure to shut off and absorb electromagnetic noise.

For shutting off the electromagnetic noise, countermeasures are taken by using an electromagnetic wave absorbing material for a casing of a motor, or covering a motor with a metal casing. However, in a case of using an electromagnetic wave absorbing member or a metal casing, material cost and assembling man-hours are increased, and cost is increased.

CITATION LIST

Patent Literature

Patent Literature 1: Japanese Patent Publication (JP-B) No. 4083353

SUMMARY OF INVENTION

Technical Problem

The present invention has been made in view of the above circumstances, and an object of the invention is to provide a brushless motor capable of effectively shutting off and absorbing electromagnetic noise caused from a stator, while achieving cost reduction.

Solution to Problem

In order to solve the above-mentioned problem, a brushless motor according to one aspect of the invention includes: a shaft made of metal; a rotor having a rotor housing that is made of metal, that has a peripheral wall portion and a top wall portion, that is fixed to the shaft, and that has a magnet secured to an inner peripheral surface of the peripheral wall portion; a stator accommodated inside the rotor housing and radially opposed to the magnet; a first bearing and a second bearing that are made of metal and assembled at the shaft; a bearing holder member that is made of metal and holds the first bearing; a center piece that is made of resin and holds the second bearing and the stator; a circuit board that drives the stator; and a conductive part that is provided at the center piece and that electrically connects the bearing holder member and the second bearing to a ground part of the circuit board.

According to this brushless motor, since the center piece that holds the second bearing and the stator is made of resin, the material cost can be reduced as compared with a case where the center piece is made of metal, for example, whereby cost reduction can be achieved.

In addition, the center piece is provided with the conductive part that electrically connects the bearing holder member and the second bearing to the ground part of the circuit board. As a result, it is possible to establish: a first earth ground path formed by the rotor housing, the shaft, the first bearing, the bearing holder member, and the conductive part; and a second earth ground path formed by the rotor housing, the shaft, the second bearing, and the conductive part. Therefore, the number of earth ground paths is increased as compared with a case where the earth ground path from the metal rotor housing accommodating the stator to the ground part is one system, whereby electromagnetic noise caused from the stator can be effectively shut off and absorbed.

DESCRIPTION OF EMBODIMENTS

Hereinafter, one embodiment of the invention will be described with reference to the drawings.

Figure 1:
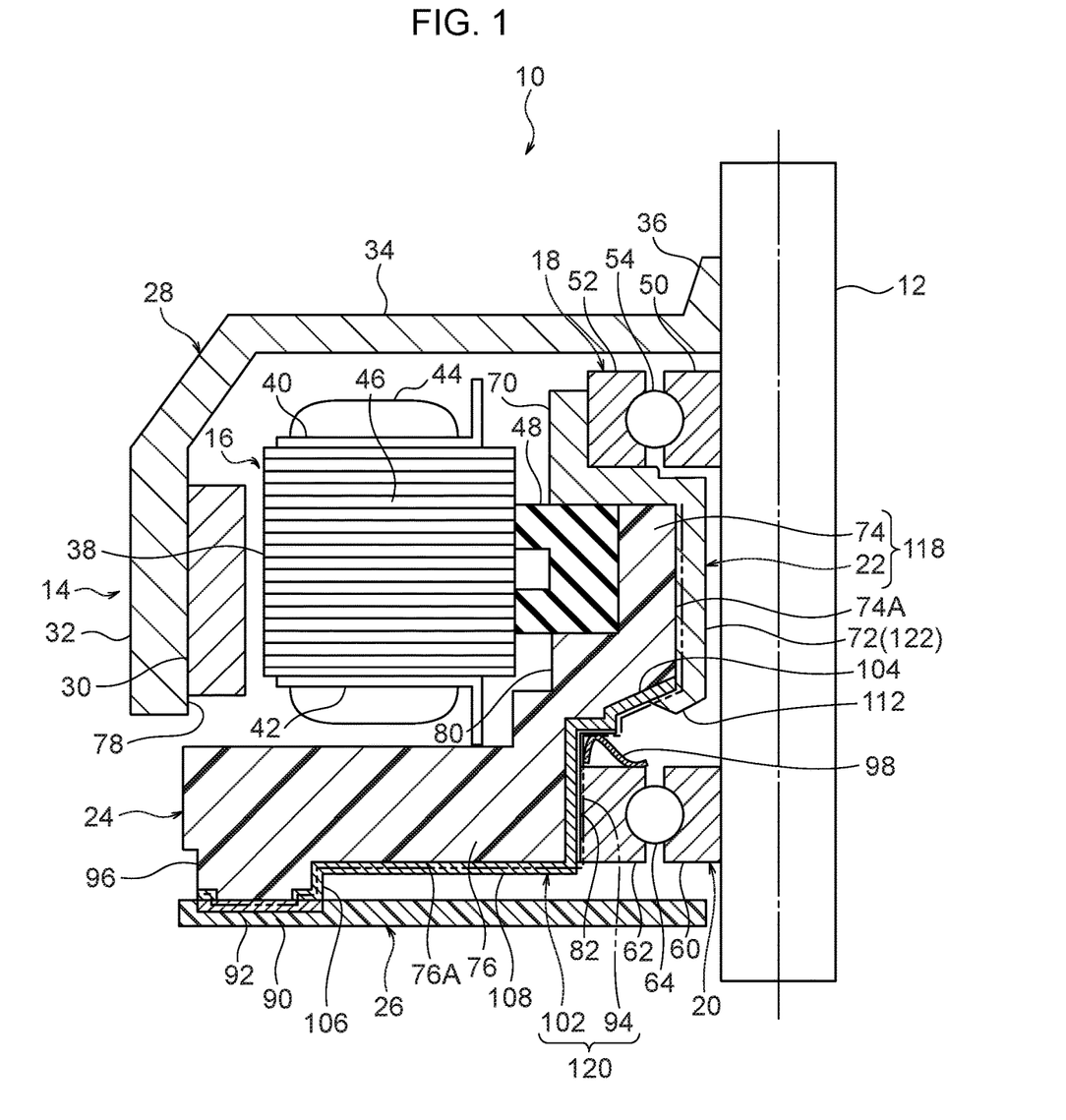
FIG. 1 is a vertical cross-sectional view showing a configuration of one side half from a shaft of a brushless motor according to one embodiment of the present invention.
Figure 2:
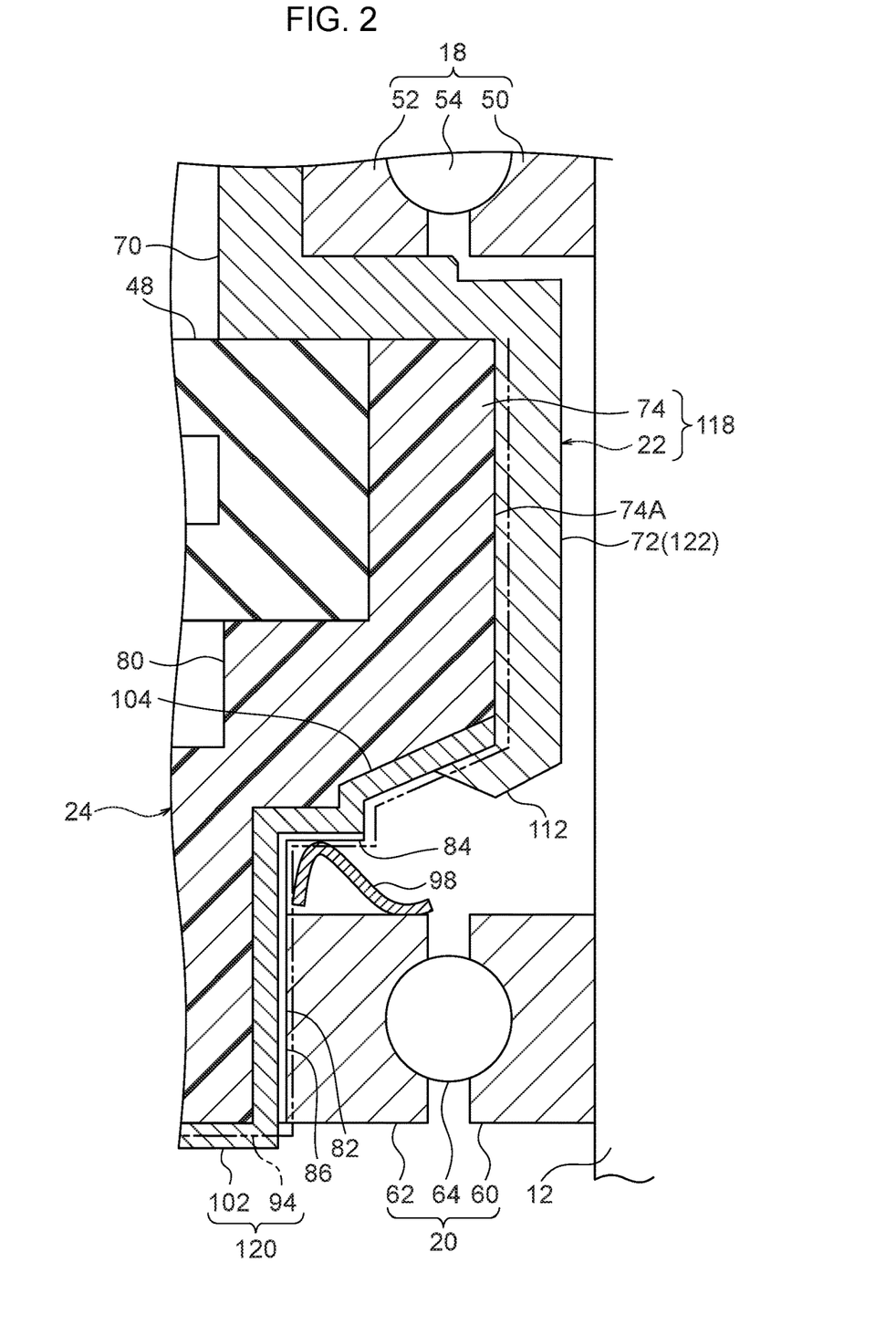
FIG. 2 is an enlarged view of a peripheral portion of a first bearing and a second bearing of FIG. 1.
Figure 3:
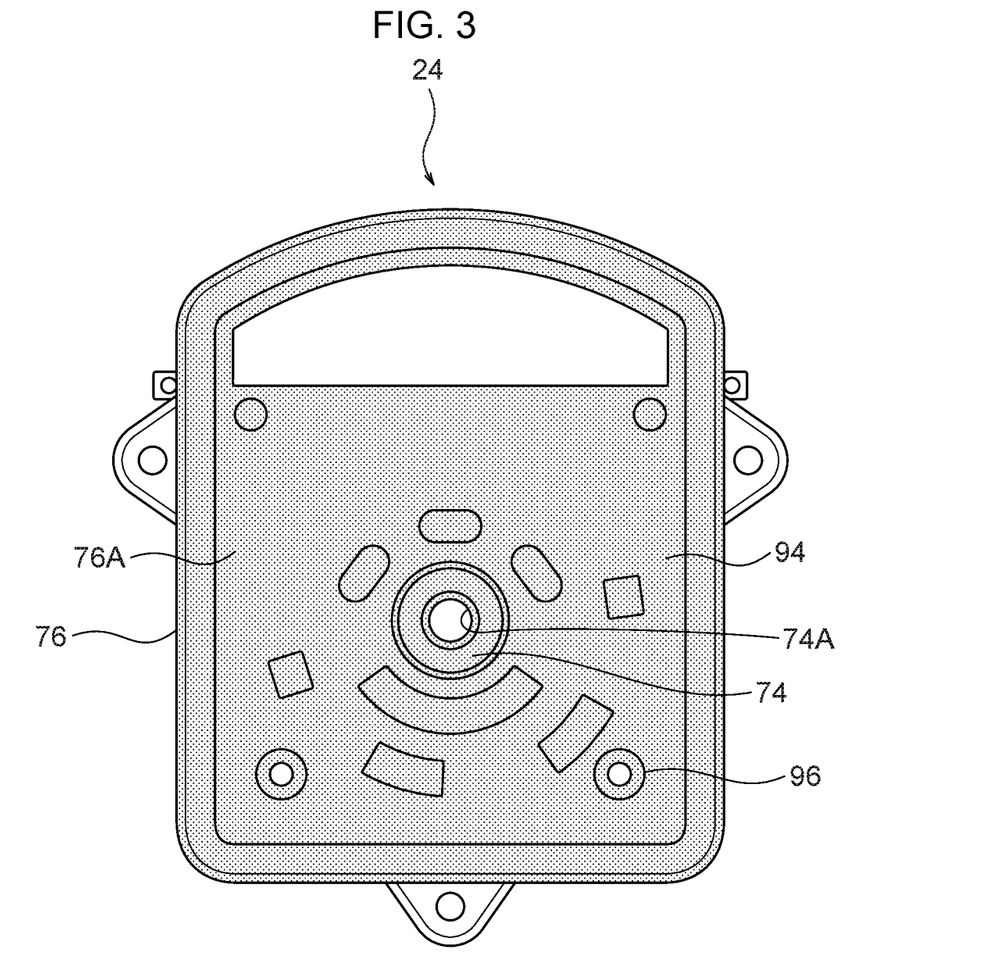
FIG. 3 is a bottom view of a center piece shown in FIG. 1.
Figure 4:
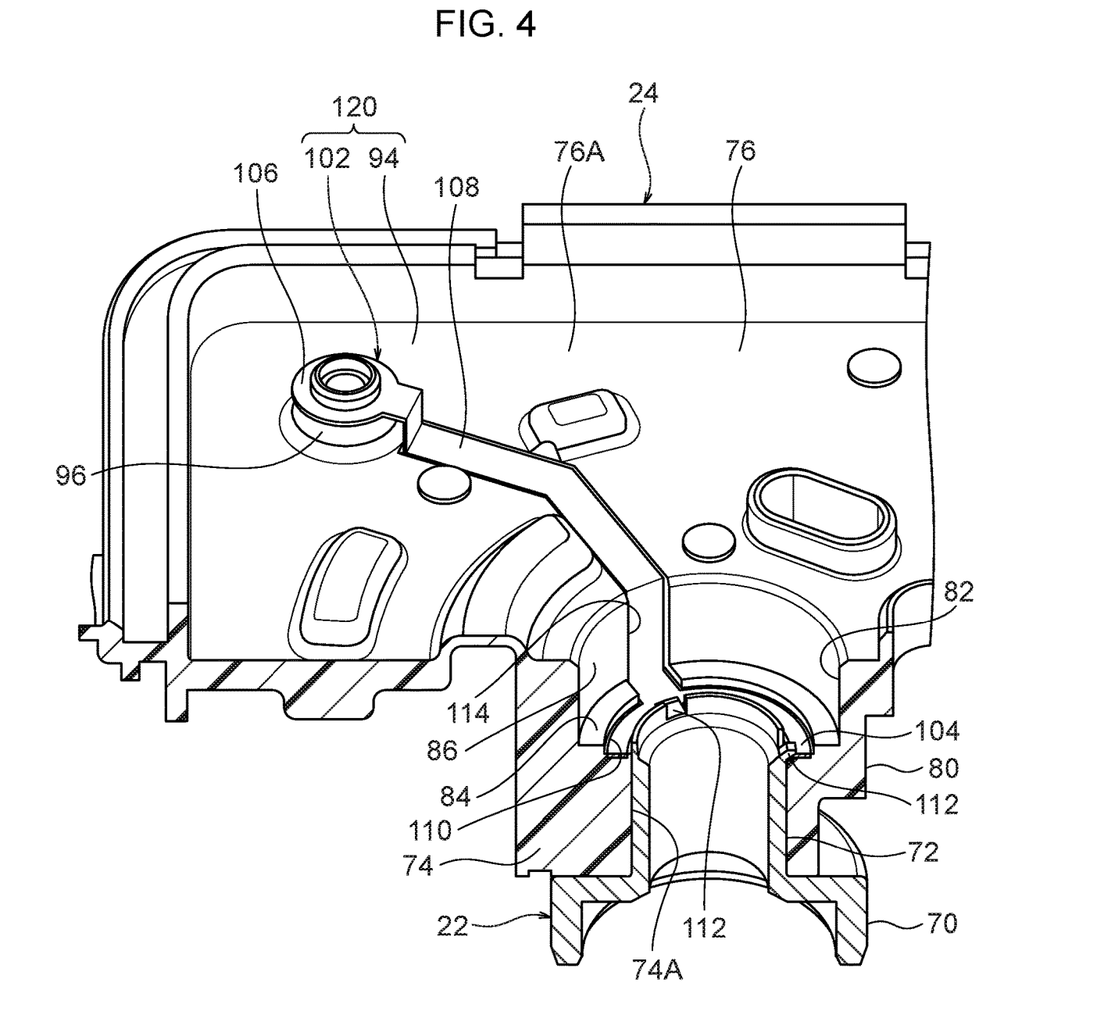
FIG. 4 is an enlarged perspective view of a main part of a bearing holder member and the center piece shown in FIG. 1.

As shown in FIG. 1, a brushless motor 10 includes: a shaft 12; a rotor 14; a stator 16; a first bearing 18; a second bearing 20; a bearing holder member 22; a center piece 24; and a circuit board 26 (see also FIGS. 2 to 4 if appropriate).

The shaft 12 is formed of a metal round bar. The rotor 14 has a rotor housing 28 and a magnet 30. The rotor housing 28 is formed in a topped cylindrical shape having a peripheral wall portion 32 and a top wall portion 34. The shaft 12 is press-fitted inside a tubular portion 36 formed at a central portion of the top wall portion 34, whereby the rotor housing 28 is fixed to the shaft 12 to be integrally rotatable. The rotor housing 28 is made of metal and conducted to the shaft 12. The magnet 30 is secured to an inner peripheral surface of the peripheral wall portion 32.

The stator 16 has a stator core 38, a pair of insulators 40 and 42, and a plurality of winding wires 44. The stator core 38 has a plurality of teeth parts 46 extending radially. The pair of insulators 40 and 42 are mounted to the stator core 38 from both axial sides of the stator core 38, and insulate a surface of the stator core 38. The winding wires 44 are wound around the respective teeth parts 46 via the pair of insulators 40 and 42. This stator 16 is accommodated inside the rotor housing 28, and radially opposed to the magnet 30. In an inner peripheral portion of the stator 16, a rubber vibration isolator 48 is assembled at an appropriate position in a circumferential direction.

As each of the first bearing 18 and the second bearing 20, for example, a ball bearing is used. The first bearing 18 has an inner ring 50, an outer ring 52, and a rolling element 54. Similarly, the second bearing 20 has an inner ring 60, an outer ring 62, and a rolling element 64. The inner ring 50, the outer ring 52, and the rolling element 54 of the first bearing 18 are made of metal. Similarly, the inner ring 60, the outer ring 62, and the rolling element 64 of the second bearing 20 are made of metal.

In the first bearing 18, the inner ring 50 and the outer ring 52 are conducted via the rolling element 54. In the second bearing 20, the inner ring 60 and the outer ring 62 are conducted via the rolling element 64. These first bearing 18 and the second bearing 20 are provided spaced apart from each other in an axial direction of the shaft 12. The shaft 12 is inserted (press-fitted) inside each of the inner rings 50 and 60, whereby the first bearing 18 and the second bearing 20 are assembled at the shaft 12.

The bearing holder member 22 has a holder part 70 and a cylindrical portion 72. The holder part 70 is formed in an annular shape having a larger diameter than the cylindrical portion 72. The first bearing 18 is accommodated (press-fitted) inside this holder part 70, whereby the first bearing 18 is held by the holder part 70. This holder part 70 is located on one side in an axial direction of the stator 16. The bearing holder member 22 is made of metal, and this bearing holder member 22 is conducted to the outer ring 52 of the first bearing 18. The cylindrical portion 72 is provided coaxially with the holder part 70, and extends from the holder part 70 to the second bearing 20 side. The shaft 12 is inserted (loosely inserted) inside the cylindrical portion 72.

The center piece 24 is made of resin, and has a center part 74 and a plate-like portion 76. The center part 74 is formed in a substantially cylindrical shape, and is formed at a center of the center piece 24. The cylindrical portion 72 of the above-described bearing holder member 22 is press-fitted inside the center part 74, whereby the bearing holder member 22 is held by the center piece 24 (center part 74). The center part 74 is inserted inside the stator core 38 formed in an annular shape. The plate-like portion 76 is formed in a substantially flat plate shape with an axial direction of the center part 74 as a plate thickness direction. This plate-like portion 76 is formed on a base end side of the center part 74, and opposed to an opening 78 of the rotor housing 28.

In the center part 74, there is formed a base part 80 located on another side in the axial direction of the stator 16, and the rubber vibration isolator 48 assembled to the inner peripheral portion of the stator 16 described above is sandwiched by the holder part 70 and the base part 80 from both sides in the axial direction, and fixed. As a result, the stator 16 is held by the bearing holder member 22 and the center piece 24 via the rubber vibration isolator 48.

On the base end side of the center part 74, there is formed a housing part 82 having a recessed shape that opens opposite to a side where the holder part 70 opens. The housing part 82 has a bottom wall surface 84 and a peripheral wall surface 86 (see FIG. 2). The second bearing 20 is accommodated (press-fitted) inside this housing part 82, whereby the second bearing 20 is held by the center part 74 of the center piece 24.

The circuit board 26 drives the stator 16, and is arranged on an opposite side to the stator 16 with respect to the plate-like portion 76. This circuit board 26 has a board body 90 and a plurality of electronic components mounted on the board body 90. The plurality of electronic components include, for example, a switching element that is electrically connected to the plurality of winding wires 44 and switches a direction of a current flowing through the plurality of winding wires 44, and a control element that controls the switching operation of this switching element, and the like. On a surface of the board body 90, a ground part 92 (GND) is provided.

In the center piece 24 described above, a plating layer 94 having conductivity is formed on an inner peripheral surface 74A of the center part 74, and on an entire surface on an opposite side 76A to the stator 16 on the plate-like portion 76 (see also FIG. 3). In FIGS. 1 and 2, the plating layer 94 is indicated by a two-dot chain line. This plating layer 94 is in contact with an outer peripheral surface of the cylindrical portion 72 of the bearing holder member 22 on the inner peripheral surface 74A of the center part 74, and in contact with the ground part 92 of the circuit board 26 at a connecting part 96 formed in the plate-like portion 76 of the center piece 24. The bearing holder member 22 and the ground part 92 are electrically connected via this plating layer 94.

As shown in FIG. 2, the bottom wall surface 84 of the housing part 82 is opposed to the outer ring 62 of the second bearing 20 with a gap in the axial direction, and a metal preload member 98 is interposed between the bottom wall surface 84 and the outer ring 62. This preload member 98 is a wave washer for example, and axially preloads the outer ring 62 of the second bearing 20 against the bottom wall surface 84.

The above-described plating layer 94 extends over the bottom wall surface 84 and the peripheral wall surface 86 of the housing part 82. The plating layer formed on the bottom wall surface 84 is in contact with the preload member 98, and the plating layer formed on the peripheral wall surface 86 is in contact with the outer peripheral surface of the outer ring 62 of the second bearing 20. Then, the second bearing 20 and the ground part 92 described above are electrically connected via the preload member 98 and the plating layer 94.

As shown in FIGS. 1, 2, and 4, the center piece 24 is provided with a terminal member 102. This terminal member 102 has a first annular portion 104, a second annular portion 106, and a belt-like portion 108.

As shown in FIG. 4, the first annular portion 104 is formed at one end of the terminal member 102. This first annular portion 104 is provided along a periphery of an end part of the cylindrical portion 72 on an opposite side to the holder part 70. On the bottom wall surface 84, there is formed an annular groove 110 extending along a periphery of the cylindrical portion 72, and the first annular portion 104 is accommodated in the groove 110.

At the end part of the cylindrical portion 72 on the opposite side to the holder part 70, a plurality of swaging pieces 112 are formed. By swaging these swaging piece 112 to be bent toward the bottom wall surface 84 side, the first annular portion 104 is sandwiched between the swaging pieces 112 and a bottom surface of the groove 110 formed on the bottom wall surface 84. As a result that the first annular portion 104 is sandwiched between the swaging pieces 112 and the bottom surface of the groove 110, this first annular portion 104 is conducted to the bearing holder member 22 including the cylindrical portion 72, in a close contact state.

The second annular portion 106 is formed at another end of the terminal member 102. This second annular portion 106 is mounted to the cylindrical connecting part 96 projecting from the plate-like portion 76. The belt-like portion 108 extends in a belt-like shape and connects the first annular portion 104 and the second annular portion 106. On the bottom wall surface 84 and the peripheral wall surface 86 of the housing part 82 a groove 114 is formed, and the belt-like portion 108 is accommodated in the groove 114. Then, via the terminal member 102 having the first annular portion 104, the second annular portion 106, and the belt-like portion 108, the bearing holder member 22 and the ground part 92 are electrically connected.

As shown in FIG. 2, in the present embodiment, the bearing holder member 22 and the center part 74 of the center piece 24 described above form a bearing holder part 118. As described above, the bearing holder member 22 is entirely made of metal, and the plating layer is formed on the inner peripheral surface of the center part 74. As a result, an inner peripheral portion of the bearing holder part 118 formed by the bearing holder member 22 and the center part 74 has conductivity. The inner peripheral portion of the bearing holder part 118 is configured to have an inner peripheral surface of the holder part 70, the cylindrical portion 72 of the bearing holder member 22, and an inner peripheral surface of the housing part 82. In addition, the terminal member 102 and the plating layer 94 form a conductive part 120 that electrically connects the inner peripheral portion of the bearing holder part 118 and the ground part 92 (see FIG. 1).

Figure 5:
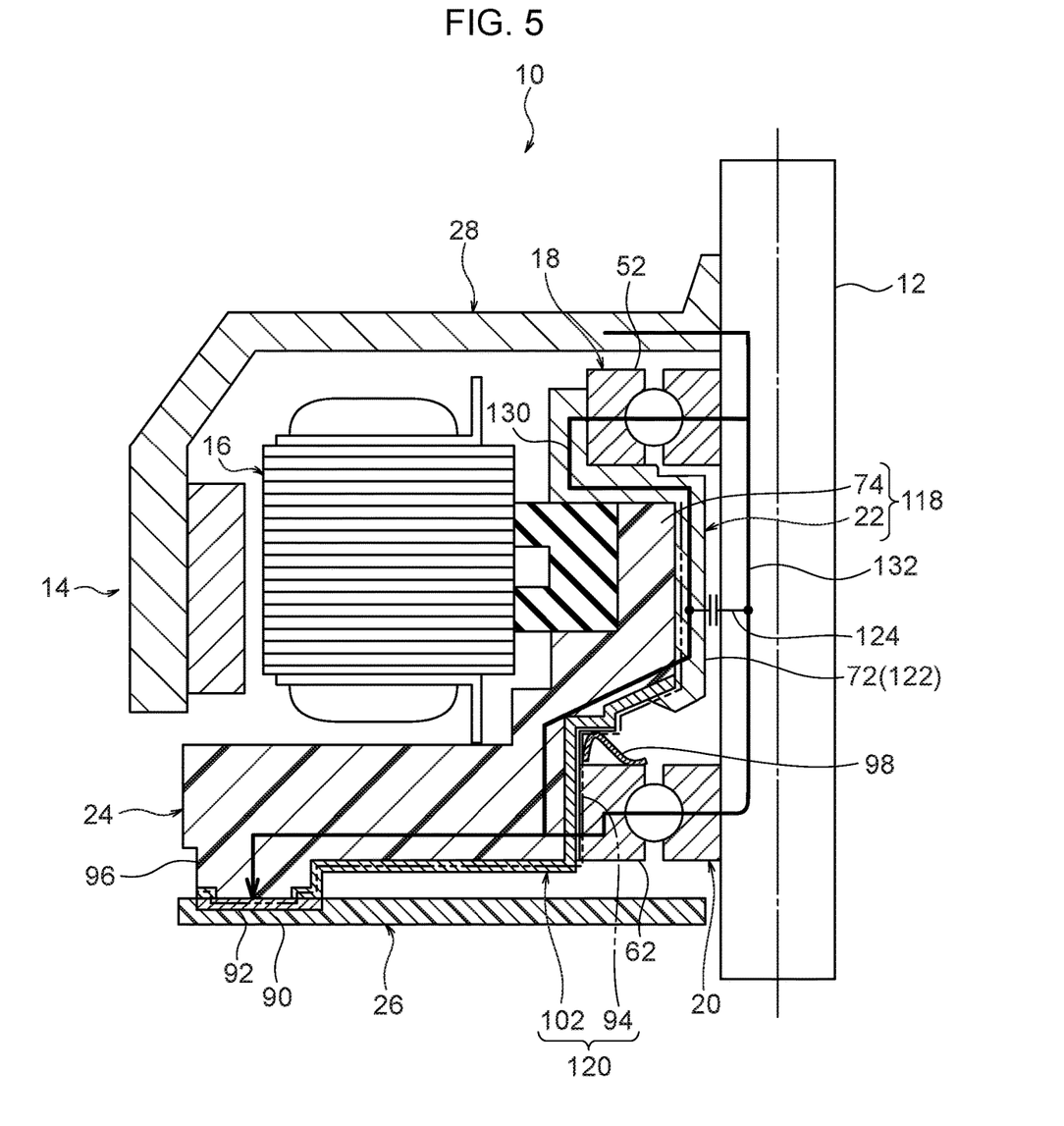
FIG. 5 is a view indicating a first earth ground path and a second earth ground path in the brushless motor of FIG. 1.

Then, in this embodiment, as shown in FIG. 5, the above-described conductive structure allows establishment of: a first earth ground path 130 formed by the rotor housing 28, the shaft 12, the first bearing 18, the bearing holder part 118, and the conductive part 120; and a second earth ground path 132 formed by the rotor housing 28, the shaft 12, the second bearing 20, and the conductive part 120.

In order to improve an EMC performance of the brushless motor 10, it is effective to reduce impedance between the ground part 92, and the rotor housing 28 and the shaft 12.

Here, the first bearing 18 and the second bearing 20 are ball bearings each having an inner ring, an outer ring, and a rolling element. Since dielectric grease normally exists between sliding parts of the ball bearing, the sliding parts of the ball bearing are in a state of being electrostatically coupled, electrically. Therefore, the first bearing 18 and the second bearing 20 are equivalent circuits of an electric resistance component and an electrostatic capacity component. Reducing the electrical resistance of these first bearing 18 and the second bearing 20 is effective for improving the EMC performance. However, there is a limit for reducing the electrical resistance of the ball bearing having the sliding part.

Therefore, a structure is adopted in which a portion between the first bearing 18 and the second bearing 20 in the inner peripheral portion of the bearing holder part 118, that is, as an example, the cylindrical portion 72 of the bearing holder member 22 is closely opposed to the shaft 12 in the radial direction, in the present embodiment. Then, this cylindrical portion 72 serves as an electrostatic coupling portion 122 that is electrostatically coupled to the shaft 12.

This electrostatic coupling portion 122 (cylindrical portion 72) is made close to the shaft 12 so as to be located closer to the shaft 12 than the respective outer rings 52 and 62 of the first bearing 18 and the second bearing 20. Further, the electrostatic coupling portion 122 linearly extends along the shaft 12 from one axial end to another axial end of the electrostatic coupling portion 122. As a result, the electrostatic coupling portion 122 is electrostatically coupled to the shaft 12 from one axial end to another axial end of the electrostatic coupling portion 122.

Figure 6:
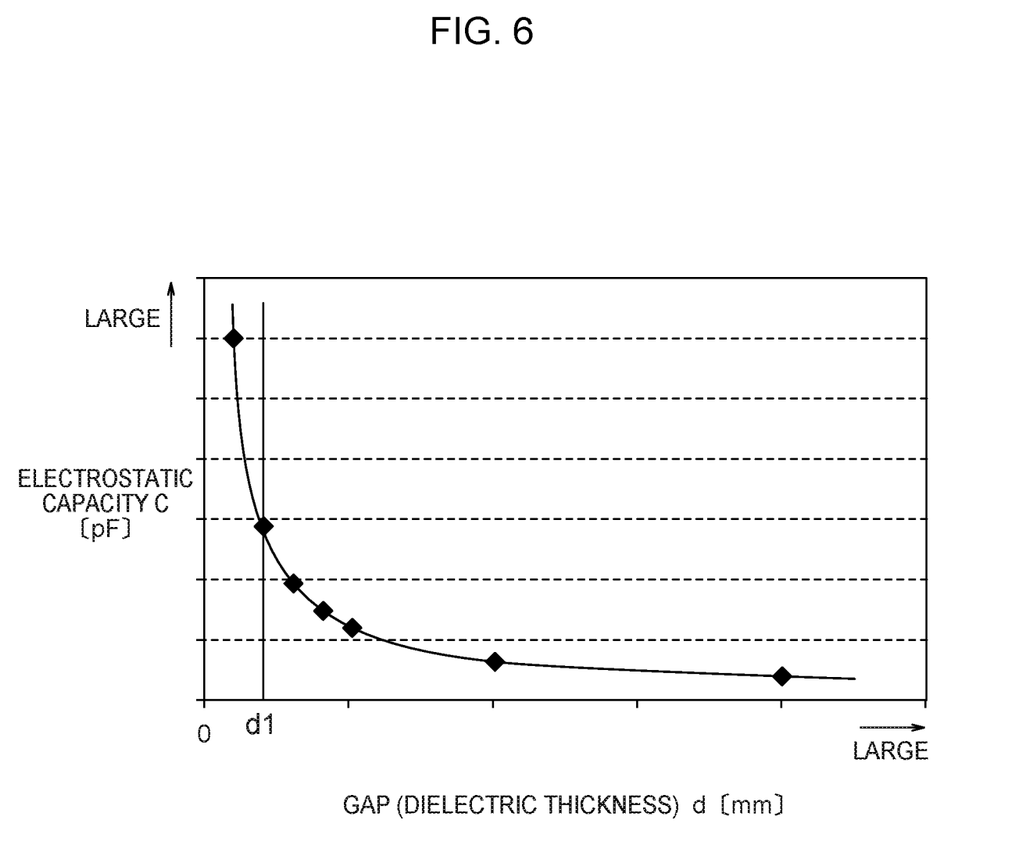
FIG. 6 is a graph showing a relationship between an electrostatic capacity of an electrostatic coupling portion and a gap.

FIG. 6 shows a relationship between an electrostatic capacity C [pF] of the electrostatic coupling portion 122 and a gap d [mm]. The gap d is a distance between the electrostatic coupling portion 122 and the shaft 12, and corresponds to a thickness of a dielectric. Since the electrostatic capacity C is expressed by $C=\varepsilon \times S/d$ ($\varepsilon$: dielectric constant, S: electrode area, d: dielectric thickness), the capacitance C is increased by reducing the gap (thickness of the dielectric) d. In the present embodiment, the gap (the thickness of the dielectric material) between the electrostatic coupling portion 122 and the shaft 12 is set to be equal to or less than d 1 so as to obtain the desired electrostatic capacitance C.

Hereinafter, operation and effect of one embodiment of the invention will be described.

As described in detail above, according to the brushless motor 10 according to the embodiment of the invention, the center piece 24 that holds the second bearing 20 and the stator 16 is made of resin. Therefore, cost reduction can be achieved since the material cost can be reduced as compared with a case where the center piece 24 is made of metal, for example.

Further, the center piece 24 is provided with the conductive part 120 (the plating layer 94 and the terminal member 102) that electrically connects the bearing holder member 22 and the second bearing 20 to the ground part 92 of the circuit board 26. As a result, it is possible to establish: the first earth ground path 130 formed by the rotor housing 28, the shaft 12, the first bearing 18, the bearing holder 22, and the conductive part 120; and the second earth ground path 132 formed by the rotor housing 28, the shaft 12, the second bearing 20, and the conductive part 120, as shown in FIG. 5. Therefore, the number of earth ground paths is increased as compared with a case where the earth ground path from the metallic rotor housing 28 accommodating the stator 16 to the ground part 92 is one system, whereby electromagnetic noise caused from the stator 16 can be effectively shut off and absorbed.

In addition, since the conductive part 120 has a simple structure having the plating layer 94 and the terminal member 102, further cost reduction can be achieved.

According to the brushless motor 10 according to the embodiment of the invention, as described above, the first earth ground path 130 and the second earth ground path 132 are established, and the number of ground paths is increased, so that it is possible to reduce the impedance between the ground part 92, and the rotor housing 28 and the shaft 12.

Between the first bearing 18 and the second bearing 20 in the inner peripheral portion of the bearing holder part 118, there is formed the electrostatic coupling portion 122 that is radially opposed to the shaft 12 and electrostatically coupled to the shaft 12. Therefore, an electrostatic capacity component 124 is brought into a state connected in parallel between the first earth ground path 130 and the second earth ground path 132, so that it is possible to further reduce the impedance between the ground part 92, and the rotor housing 28 and the shaft 12.

As described above, even in a case where electromagnetic noise is emitted from the stator 16, a potential induced by the rotor 14 and the shaft 12 can be efficiently induced to the ground part 92 (GND) of the circuit board 26, whereby the EMC performance of the brushless motor 10 can be improved.

The cylindrical portion 72 of the bearing holder member 22 is closely opposed to the shaft 12 in the radial direction, and this cylindrical portion 72 serves as the electrostatic coupling portion 122 electrostatically coupled to the shaft 12. Therefore, it is not necessary to specially change a shape or the like of the original cylindrical portion 72 in order to obtain the electrostatic coupling portion 122, whereby increase in cost can be suppressed. In addition, since the cylindrical portion 72 extends linearly along the shaft 12, an opposing area between the electrostatic coupling portion 122 and the shaft 12 can also be sufficiently secured. Further, since deflection of the electrostatic coupling portion 122 can be reduced by forming the electrostatic coupling portion 122 on a part of the bearing holder part 118 that holds the first bearing 18 and the second bearing 20, a gap between the electrostatic coupling portion 122 and the shaft 12 can be reduced.

Since the electrostatic coupling portion 122 (cylindrical portion 72) is made close to the shaft 12 so as to be located closer to the shaft 12 than the respective outer rings 52 and 62 of the first bearing 18 and the second bearing 20, a gap between the electrostatic coupling portion 122 and the shaft 12 can be reduced. This makes it possible to reduce the thickness d of the dielectric represented by electrostatic capacity $C=\varepsilon \times S/d$ ($\varepsilon$: dielectric constant, S: electrode area, d: dielectric thickness). As a result, it is possible to increase the electrostatic capacity C of the electrostatic capacity component 124 formed between the first earth ground path 130 and the second earth ground path 132, whereby it is possible to further reduce the impedance between the ground part 92, and the rotor housing 28 and the shaft 12.

The electrostatic coupling portion 122 linearly extends along the shaft 12, whereby the electrostatic coupling portion 122 is electrostatically coupled to the shaft 12 from one axial end to another axial end of the electrostatic coupling portion 122. This makes it possible to increase the electrode area S represented by electrostatic capacity $C=\varepsilon \times S/d$ ($\varepsilon$: dielectric constant, S: electrode area, d: dielectric thickness). As a result, it is possible to increase the electrostatic capacity C of the electrostatic capacity component 124 formed between the first earth ground path 130 and the second earth ground path 132, whereby it is possible to further reduce the impedance between the ground part 92, and the rotor housing 28 and the shaft 12.

Hereinafter, modifications of one embodiment of the invention will be described.

Figure 7:
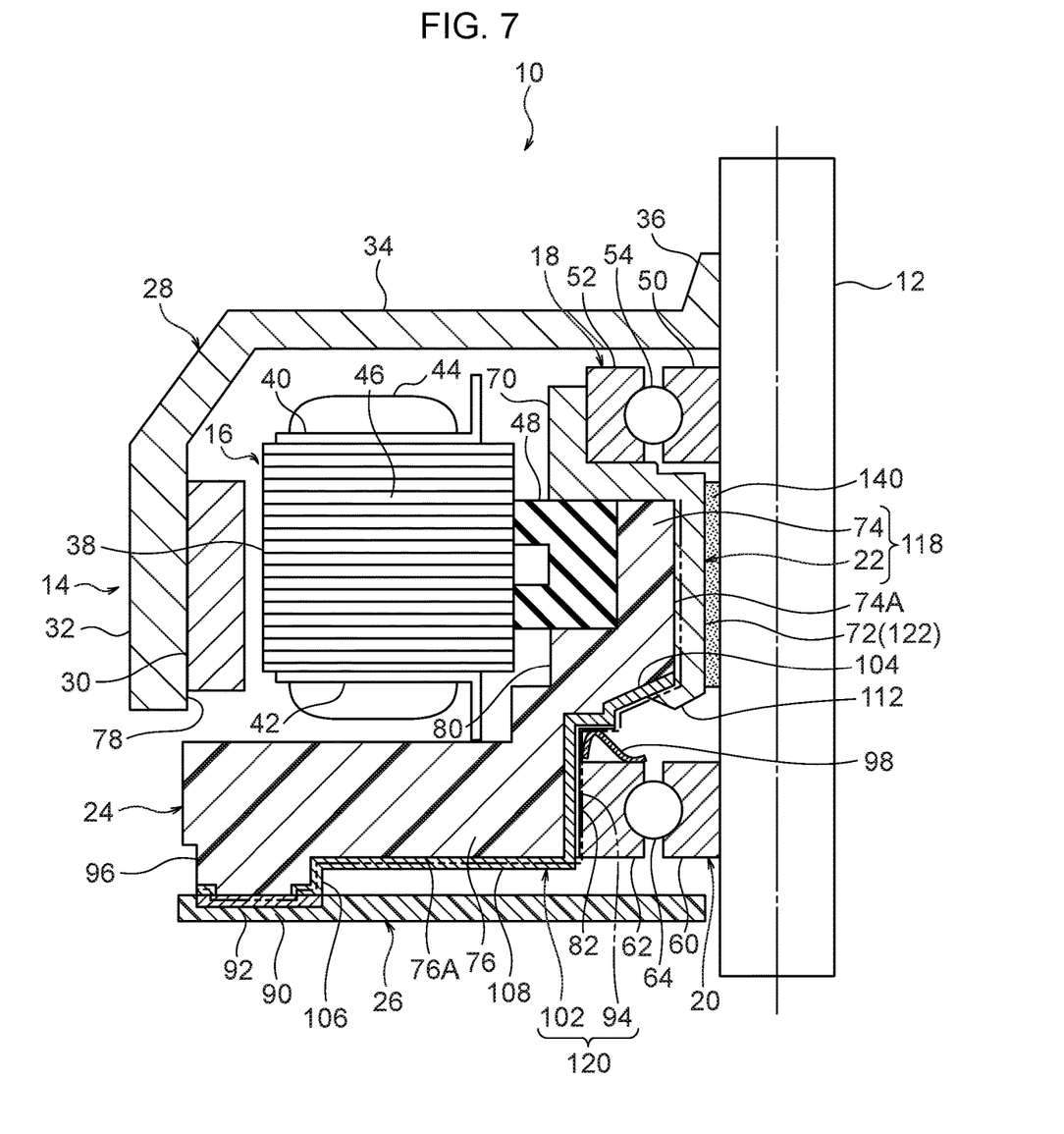
FIG. 7 is a longitudinal cross-sectional view showing a modification in which dielectric grease is interposed between the electrostatic coupling portion and the shaft shown in FIG. 1.

In the above embodiment, air is interposed between the electrostatic coupling portion 122 and the shaft 12. However, as shown in FIG. 7, dielectric grease 140 may be interposed between the electrostatic coupling portion 122 and the shaft 12.

With such a configuration, it is possible to increase the dielectric constant represented by electrostatic capacity $C=\varepsilon \times S/d$ ($\varepsilon$: dielectric constant, S: electrode area, d: dielectric thickness). As a result, it is possible to increase the electrostatic capacity C of the electrostatic capacity component 124 (see FIG. 5) formed between the first earth ground path 130 and the second earth ground path 132, whereby it is possible to further reduce the impedance between the ground part 92, and the rotor housing 28 and the shaft 12.

Figure 8:
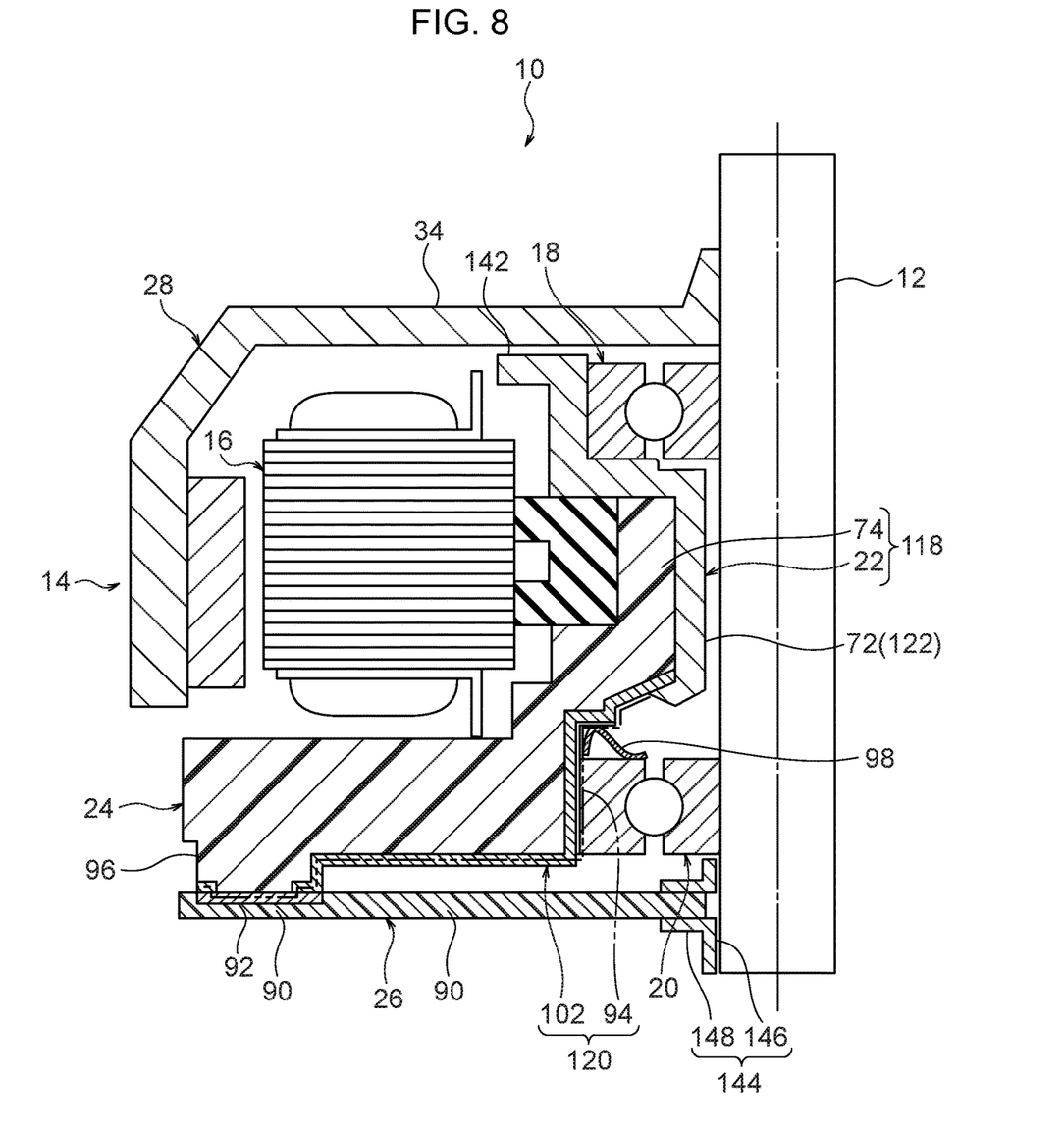
FIG. 8 is a longitudinal cross-sectional view showing a modification in which a rotor-side electrostatic coupling portion and a board-side electrostatic coupling portion are added to the brushless motor shown in FIG. 1.

As shown in FIG. 8, in the above embodiment, a rotor-side electrostatic coupling portion 142 may be formed on one side in an axial direction of the bearing holder part 118 (bearing holder member 22 made of metal). The rotor-side electrostatic coupling portion 142 is axially opposed to the top wall portion 34 of the rotor housing 28 and electrostatically coupled to the top wall portion 34. Further, this rotor-side electrostatic coupling portion 142 is formed in the bearing holder member 22, thereby being electrically connected to the cylindrical portion 72 of the bearing holder member 22, that is, the inner peripheral portion of the bearing holder part 118.

With such a configuration, it is possible to reduce the impedance between the ground part 92, and the rotor housing 28 and the shaft 12, as the rotor-side electrostatic coupling portion 142 is electrostatically coupled to the top wall portion 34 of the rotor housing 28, whereby the EMC performance of the brushless motor 10 can be further improved.

As shown in FIG. 8, in the above embodiment, the circuit board 26 may be provided with a metal collar member 144. This collar member 144 has a board-side electrostatic coupling portion 146 and a board connecting part 148. The board-side electrostatic coupling portion 146 is radially opposed to the shaft 12 and electrostatically coupled to the shaft 12, and is formed integrally with the board connecting part 148. The board connecting part 148 is electrically connected to the ground part 92 by a conductive pattern formed on the surface of the board body 90, wiring, or the like.

With such a configuration, it is possible to reduce the impedance between the ground part 92, and the rotor housing 28 and the shaft 12 as the board-side electrostatic coupling portion 146 is electrostatically coupled to the shaft 12, whereby the EMC performance of the brushless motor 10 can be further improved.

In the above embodiment, the electrostatic coupling portion 122 is preferably formed from one axial end to another axial end of the cylindrical portion 72 of the bearing holder member 22, but the electrostatic coupling portion 122 may be formed on a part in an axial direction of the cylindrical portion 72.

In the above embodiment, the center piece 24 is made of resin, but the center piece 24 may be made of metal. Then, the bearing holder part 118 formed by the bearing holder member 22 and the center part 74 of the center piece 24 may entirely have conductivity. That is, not only the inner peripheral portion of the bearing holder part 118 has conductivity, but the whole of the bearing holder part 118 may also have conductivity.

In a case where the bearing holder part 118 entirely has conductivity, the conductive part 120 not only electrically connects the inner peripheral portion of the bearing holder part 118 and the ground part 92, but may also electrically connect the inner peripheral portion of the bearing holder part 118 and other portion to the ground part 92.

In the above embodiment, the conductive part 120 includes both the plating layer 94 and the terminal member 102, but the conductive part 120 may have only either one of the plating layer 94 or the terminal member 102.

The conductive part 120 is preferably configured as described above, but any configuration may be adopted as long as at least the inner peripheral portion of the bearing holder part 118 is electrically connected to the ground part 92 of the circuit board 26.

In the above embodiment, ball bearings are used for the first bearing 18 and the second bearing 20, but it is also possible to use bearings of a type other than the ball bearings, such as sliding bearings, as the first bearing 18 and the second bearing 20.

Although the embodiments of the present invention have been described above, it is needless to say that the invention is not limited to the above, and the invention can be implemented with various modifications without departing from the spirit of the invention.

The invention claimed is:

1. A brushless motor, comprising:
   a shaft made of metal;
   a rotor having a rotor housing that is made of metal, that has a peripheral wall portion and a top wall portion, that is fixed to the shaft, and that has a magnet secured to an inner peripheral surface of the peripheral wall portion;
   a stator accommodated inside the rotor housing and radially opposed to the magnet;
   a first bearing and a second bearing that are made of metal and assembled at the shaft;
   a bearing holder member that is made of metal and holds the first bearing;
   a center piece that is made of resin and holds the second bearing and the stator;
   a circuit board that drives the stator; and
   a conductive part that is provided at the center piece and that electrically connects the bearing holder member and the second bearing to a ground part of the circuit board.

2. The brushless motor according to claim 1, wherein:
   in the bearing holder member and the center piece, a bearing holder part is formed in a tubular shape, the bearing holder part having conductivity at least in an inner peripheral portion thereof and accommodating the first bearing and the second bearing inside the inner peripheral portion;
   the conductive part electrically connects at least the inner peripheral portion of the bearing holder part to the ground part of the circuit board; and
   between the first bearing and the second bearing in the inner peripheral portion of the bearing holder part, an electrostatic coupling portion is formed that is radially opposed to the shaft and electrostatically coupled to the shaft.

3. The brushless motor according to claim 2, wherein:
   the first bearing and the second bearing are ball bearings each having an inner ring and an outer ring; and
   the electrostatic coupling portion is located closer to the shaft than the respective outer rings of the first bearing and the second bearing.

4. The brushless motor according to claim 2, wherein the electrostatic coupling portion is electrostatically coupled to the shaft from one axial end to another axial end of the electrostatic coupling portion.

5. The brushless motor according to claim 2, wherein dielectric grease is interposed between the electrostatic coupling portion and the shaft.

6. The brushless motor according to claim 2, further comprising a rotor-side electrostatic coupling portion that is formed on one side in an axial direction of the bearing holder part, axially opposed to the top wall portion of the rotor housing, electrostatically coupled to the top wall portion, and electrically connected to the inner peripheral portion of the bearing holder part.

7. The brushless motor according to claim 2, further comprising a board-side electrostatic coupling portion that is provided at the circuit board, radially opposed to the shaft, electrostatically coupled to the shaft, and electrically connected to the ground part.

\* \* \* \* \*